(12) United States Patent
Sineath et al.

(10) Patent No.: US 11,380,450 B2
(45) Date of Patent: Jul. 5, 2022

(54) METHODS FOR AIRFLOW CONTROL IN REACTOR PASSIVE DECAY HEAT REMOVAL USING A DAMPER

(71) Applicant: GE-Hitachi Nuclear Energy Americas LLC, Wilmington, NC (US)

(72) Inventors: James P. Sineath, Summerville, SC (US); Dean D. Molinaro, Clearwater, FL (US); William C. Dawn, Stafford, VA (US); Eric P. Loewen, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 184 days.

(21) Appl. No.: 17/163,511

(22) Filed: Jan. 31, 2021

(65) Prior Publication Data

US 2021/0319921 A1 Oct. 14, 2021

Related U.S. Application Data

(62) Division of application No. 15/785,548, filed on Oct. 17, 2017, now Pat. No. 10,937,557.

(51) Int. Cl.
*G21C 15/02* (2006.01)
*G21C 15/18* (2006.01)
*G21C 9/00* (2006.01)
*G21C 13/02* (2006.01)
*G21C 15/26* (2006.01)

(52) U.S. Cl.
CPC .............. *G21C 15/02* (2013.01); *G21C 9/00* (2013.01); *G21C 13/022* (2013.01); *G21C 15/18* (2013.01); *G21C 15/26* (2013.01)

(58) Field of Classification Search
CPC ........ G21C 15/02; G21C 15/18; G21C 15/26; G21C 9/00; G21C 13/022; Y02E 30/30
USPC .................................. 376/207, 210, 240, 283
See application file for complete search history.

(56) References Cited

U.S. PATENT DOCUMENTS

| 5,406,602 A * | 4/1995 | Hunsbedt | G21C 15/18 |
| | | | 376/299 |
| 2003/0185334 A1* | 10/2003 | Fujii | G21C 15/00 |
| | | | 376/439 |
| 2007/0028964 A1* | 2/2007 | Vasquez | F03G 7/065 |
| | | | 137/457 |

(Continued)

*Primary Examiner* — Darlene M Ritchie
(74) *Attorney, Agent, or Firm* — Ryan Alley IP

(57) ABSTRACT

Damper systems selectively reduce coolant fluid flow in nuclear reactor passive cooling systems, including related RVACS. Systems include a damper that blocks the flow in a coolant conduit and is moveable to open, closed, and intermediate positions. The damper blocks the coolant flow when closed to prevent heat loss, vibration, and development of large temperature gradients, and the damper passively opens, to allow full coolant flow, at failure and in transient scenarios. The damper may be moveable by an attachment extending into the coolant channel that holds the damper in a closed position. When a transient occurs, the resulting loss of power and/or overheat causes the attachment to stop holding the damper, which may be driven by gravity, pressure, a spring, or other passive structure into the open position for full coolant flow. A power source and temperature-dependent switch may detect and stop holding the damper closed in such scenarios.

19 Claims, 3 Drawing Sheets

(56) References Cited

U.S. PATENT DOCUMENTS

| | | | | |
|---|---|---|---|---|
| 2009/0260584 A1* | 10/2009 | Watakabe | ............... | F22B 1/023 |
| | | | | 122/122 |
| 2013/0114778 A1* | 5/2013 | Horie | ....................... | G21C 1/03 |
| | | | | 376/282 |
| 2013/0266111 A1* | 10/2013 | Young | .................... | G21C 1/322 |
| | | | | 376/282 |
| 2016/0314859 A1* | 10/2016 | Ganesan | ................ | G21C 15/18 |
| 2017/0040071 A1* | 2/2017 | Cinotti | ................... | G21C 15/18 |
| 2017/0301420 A1* | 10/2017 | Ahlfeld | ................. | G21C 1/026 |

\* cited by examiner

METHODS FOR AIRFLOW CONTROL IN REACTOR PASSIVE DECAY HEAT REMOVAL USING A DAMPER

PRIORITY STATEMENT

This application is a divisional of, and claims priority under 35 U.S.C. §§ 120 & 121 to, U.S. patent application Ser. No. 15/785,548, filed Oct. 17, 2017, the original contents of which are incorporated herein by reference in their entirety.

BACKGROUND

FIG. 1 is a profile cross-section of a related art liquid metal nuclear reactor, such as that described in co-owned U.S. Pat. No. 5,406,602 to Hunsbedt et al. issued Apr. 11, 1995, incorporated herein in its entirety by reference. As seen in FIG. 1, annular or circular concrete silo 8, potentially underground, houses annular containment vessel 2 that in turn houses reactor 1, potentially all concentrically aligned. Reactor 1 includes a nuclear reactor core 12 submerged in a liquid metal coolant, such as liquid sodium. A space, shown as gap 3, between reactor 1 and containment vessel 2 may be filled with an inert gas, such as argon. Reactor 1 and containment vessel 2 are suspended vertically downward from upper frame 16. Concrete silo 8 may support upper frame 16 by seismic isolators 18 to maintain structural integrity of containment vessel 2 and reactor 1 during earthquakes and allow uncoupled movement between those structures and surrounding silo 8.

Reactor 1 is controlled by neutron-absorbing control rods 15 selectively inserted into or withdrawn from reactor core 12. Reactor 1 may be shut down entirely for responding to an emergency condition or performing routine maintenance by inserting control rods 15 into core 12 of fissionable fuel to deprive the fuel of the needed fission-producing neutrons. However, residual decay heat continues to be generated from core 12 decreasing exponentially over time. This heat must be dissipated from shut-down reactor 1. The heat capacity of the liquid metal coolant and adjacent reactor structures aid in dissipating the residual heat. For instance, heat may be transferred by thermal radiation from reactor 1 to containment vessel 2. Heat from containment vessel 2 may also radiate outwardly toward concrete silo 8 spaced outwardly therefrom.

Systems for removal of this decay heat vent or otherwise remove the heat from reactor 1 and surround structures to a heat sink such as the environment. One such system may be a reactor vessel auxiliary cooling system (RVACS) as shown in FIG. 1. Heat collector cylinder 5 may be concentrically between containment vessel 2 and silo 8 and define hot air riser 4 between containment vessel 2 and an inner surface of heat collector cylinder 5. Heat collector cylinder 5 may further define cold air downcomer 7 between silo 8 and an outer surface of heat collector cylinder 5. Heat may be transferred from containment vessel 2 to air in hot air riser 4. The inner surface of heat collector cylinder 5 may receive thermal radiation from containment vessel 2, with the heat therefrom being transferred by natural convection into the rising air for upward flow to remove the heat via air outlets 9. Heating of the air in riser 4 by the two surrounding hot surfaces induces natural air draft in the system with atmospheric air entering through air inlets 6 above ground level. The air from inlets 6 is ducted to cold air downcomer 7, then to the bottom of concrete silo 8, where it turns and enters hot air riser 4. The hot air is ducted to air outlets 9 above ground level.

FIG. 2 is a schematic cross-section of heat collector cylinder 5 in a vertical direction, orthogonal to the view of FIG. 1, between reactor silo 8 and containment vessel 2. An outer surface of heat collector cylinder 5 may be covered with thermal insulation 5a to reduce transfer of heat from heat collector cylinder 5 into silo 8 and into the air flowing downward in cold air downcomer 7. The greater the differential in temperature between the relatively cold air in downcomer 7 and the relatively hot air within riser 4, drives natural circulation for passive air cooling, without motor-driven pumps. This natural circulation will occur during normal reactor operation and during shutdown, with the sodium within reactor vessel 1 is at its normal level 10 (FIG. 1). Similar, related passive reactor coolant systems are described in U.S. Pat. No. 5,190,720 to Hunsbedt et al., issued Mar. 2, 1993, and U.S. Pat. No. 8,873,697 to Horie et al., issued Oct. 28, 2014, all of which are incorporated herein by reference in their entireties.

SUMMARY

Example embodiments include damper systems for use in nuclear reactor passive cooling systems, including related RVACS for molten salt reactors and other cooling channels. Example systems include a damper that is moveable in a coolant conduit between fully open, closed, and intermediate positions to restrict coolant flow to a desired degree. For example, the damper may mostly block the flow conduit during steady state operations, limiting coolant flow to 10% or less and retaining heat in the reactor for thermodynamic efficiency. The damper nonetheless moves, without external or powered intervention, into an open position at failure or in a transient scenario involving loss of power and/or reactor overheat to permit maximum cooling.

Movement of the damper may be achieved by a joint or hinge securing the damper in the flowpath, with an attachment holding or moving an end of the damper to desired positions and degrees of openness. Opening the damper may be achieved in several ways in example systems, many by passive means. For example, an electromagnet may hold the damper to the attachment in a closed position when receiving electricity, and then the damper falls or is passively biased into the open position when power is lost in a transient scenario. Or for example, a winch or other movement device may hold the attachment in the closed position, and then the damper reverts to the open position as the winch loses power in the transient. Or for example, a power source and switch(es) may be configured to provide power to the damper and/or any attachment or actuator for the same, and the switches may open in a transient scenario, allowing the damper to move into its default open position. The switch may be temperature-dependent and exposed to the coolant or reactor system so as to detect overheat and/or otherwise open, such as by melting, at a threshold temperature where cooling is necessary.

Example embodiments may be installed in coolant flowpaths at any time, potentially even during plant operation, to reduce or substantially eliminate passive coolant flow, and thus heat loss, during steady-state operation. A damper and/or temperature dependent switch may be installed directly in the coolant flow, while other components like a power source, winch, manual switches, etc. may be external or positioned anywhere desired. As the damper is moved to a position blocking a desired amount of coolant flow, heat-loss, flow-induced vibration, and extreme temperature gradients in the cooling system and reactor may be reduced for improved operations, while the damper will reliably and fully permit complete coolant flow during non-steady-state accidents and other scenarios requiring the coolant flow.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
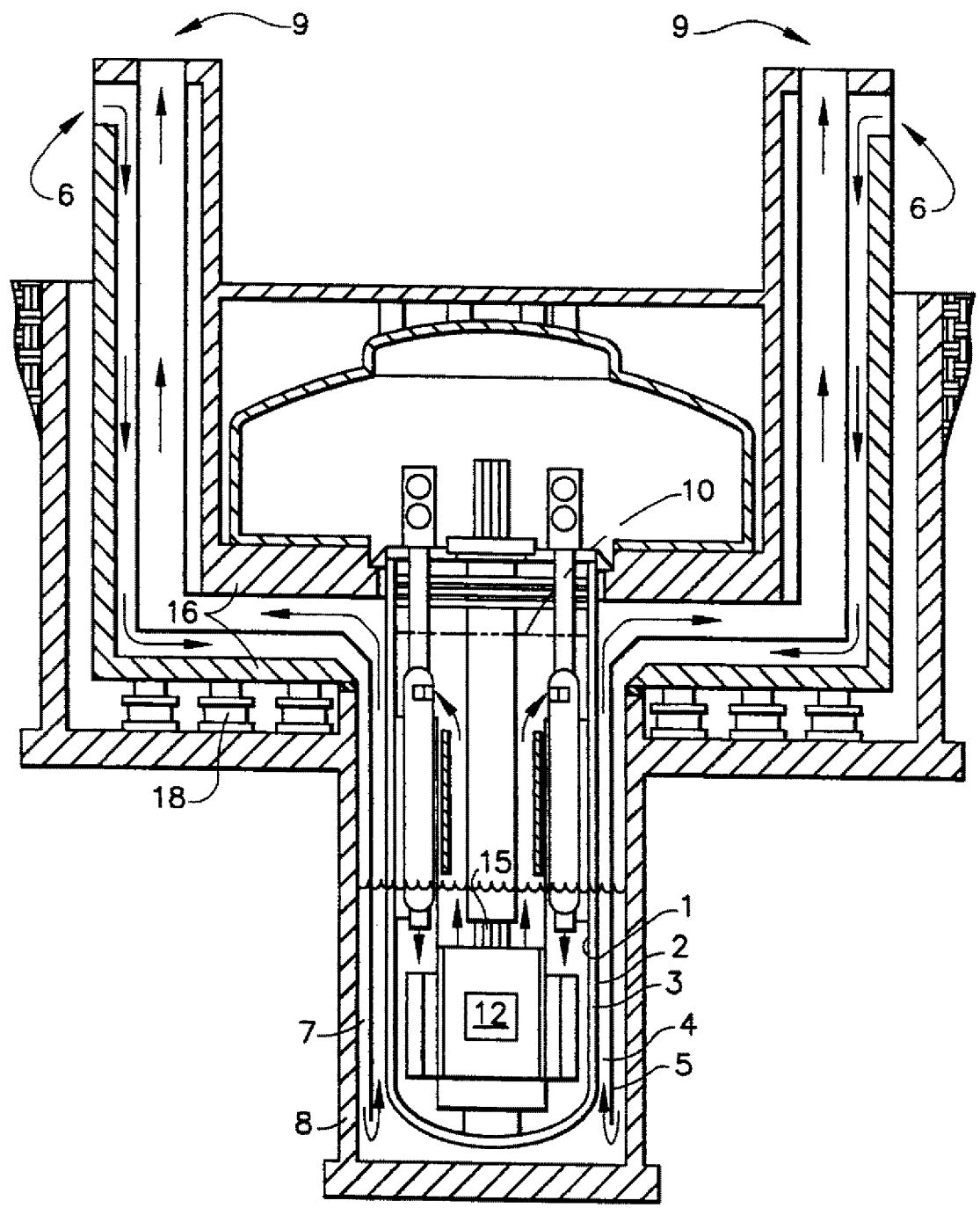
FIG. 1 is a profile schematic of a related art reactor vessel auxiliary cooling system (RVACS).

Because this is a patent document, general, broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

It will be understood that, although the ordinal terms "first," "second," etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the term "and/or" includes all combinations of one or more of the associated listed items. The use of "etc." is defined as "et cetera" and indicates the inclusion of all other elements belonging to the same group of the preceding items, in any "and/or" combination(s).

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to the same previously-introduced term. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from single operations described below. It should be presumed that any embodiment or method having features and functionality described below, in any workable combination, falls within the scope of example embodiments.

The Inventors have recognized that related passive coolant systems such as RVACS are always open to the environment and passively removing heat around a nuclear reactor. Indeed, as described in co-owned US Patent Publication 2017/0025194 to Loewen et. al, incorporated herein by reference in its entirety, always-cooling passive systems may actually accelerate airflow and cooling. While constant heat removal is useful in accidents, during normal power operations the Inventors have recognized that RVACS and related passive coolant systems can represent a significant loss of power, and thus economic efficiency, of a reactor. For example, potentially up to 2 $MW_{th}$ can be lost in conventional liquid metal reactor designs through always-on RVACS passive cooling. Always-on passive cooling in a high-temperature reactor may also cause steep temperature gradients across reactor, containment, and cooling structures, resulting in material deformation, corrosion, and/or fatigue. The constant air flow in an RVACS or other passive system may further induce unwanted vibration, potentially at irregular or resonance frequencies, that can damage or wear related systems. Passive cooling, however, must be retained for plant safety. To overcome these newly-recognized problems as well as others, the inventors have developed example embodiments and methods described below to address these and other problems recognized by the inventors with unique solutions enabled by example embodiments.

The present invention is fluid flow control systems and methods of using the same in nuclear reactor coolant systems. In contrast to the present invention, the few example embodiments and example methods discussed below illustrate just a subset of the variety of different configurations that can be used as and/or in connection with the present invention.

Figure 2:
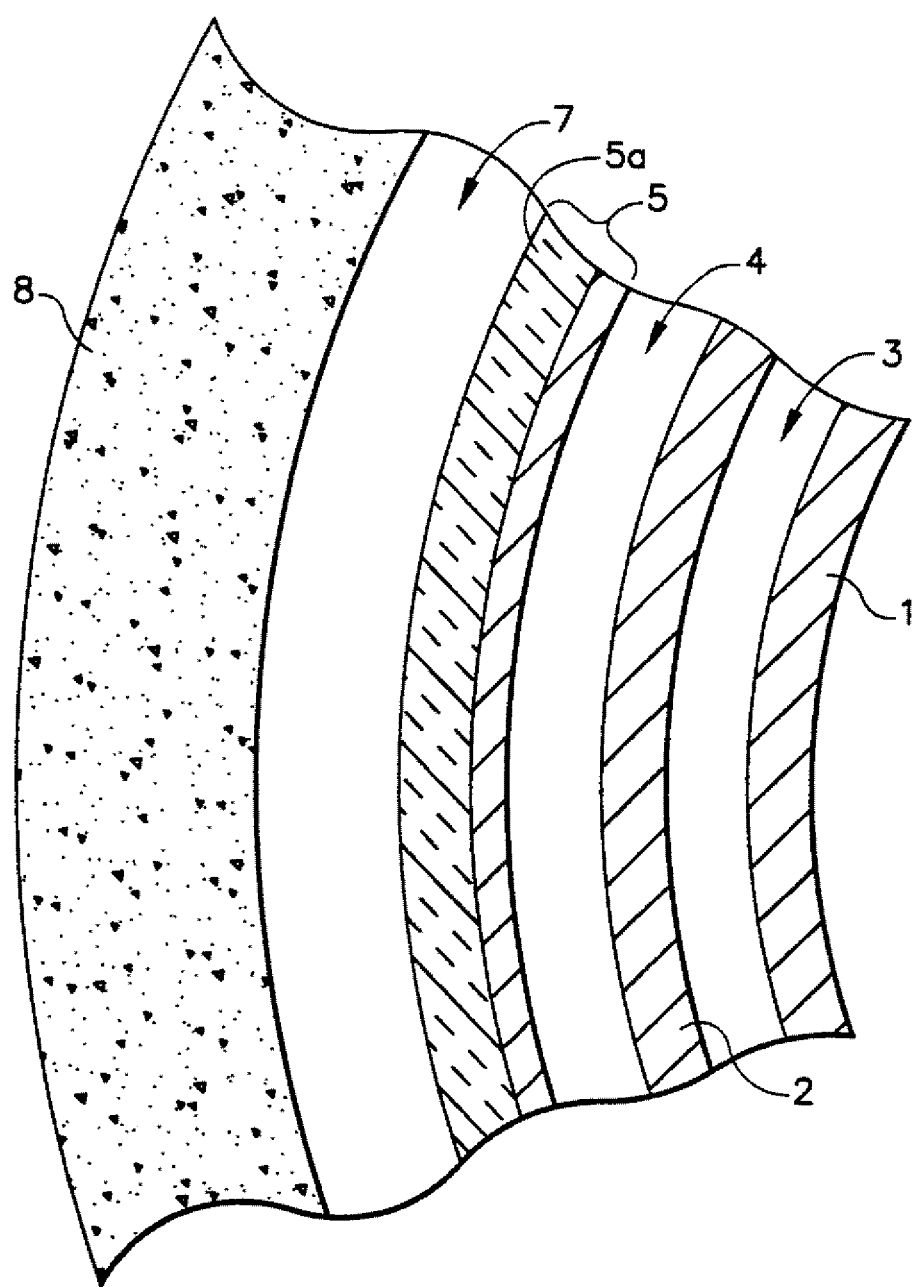
FIG. 2 is an orthogonal cross-section of a flow conduit in a related art RVACS.
Figure 3:
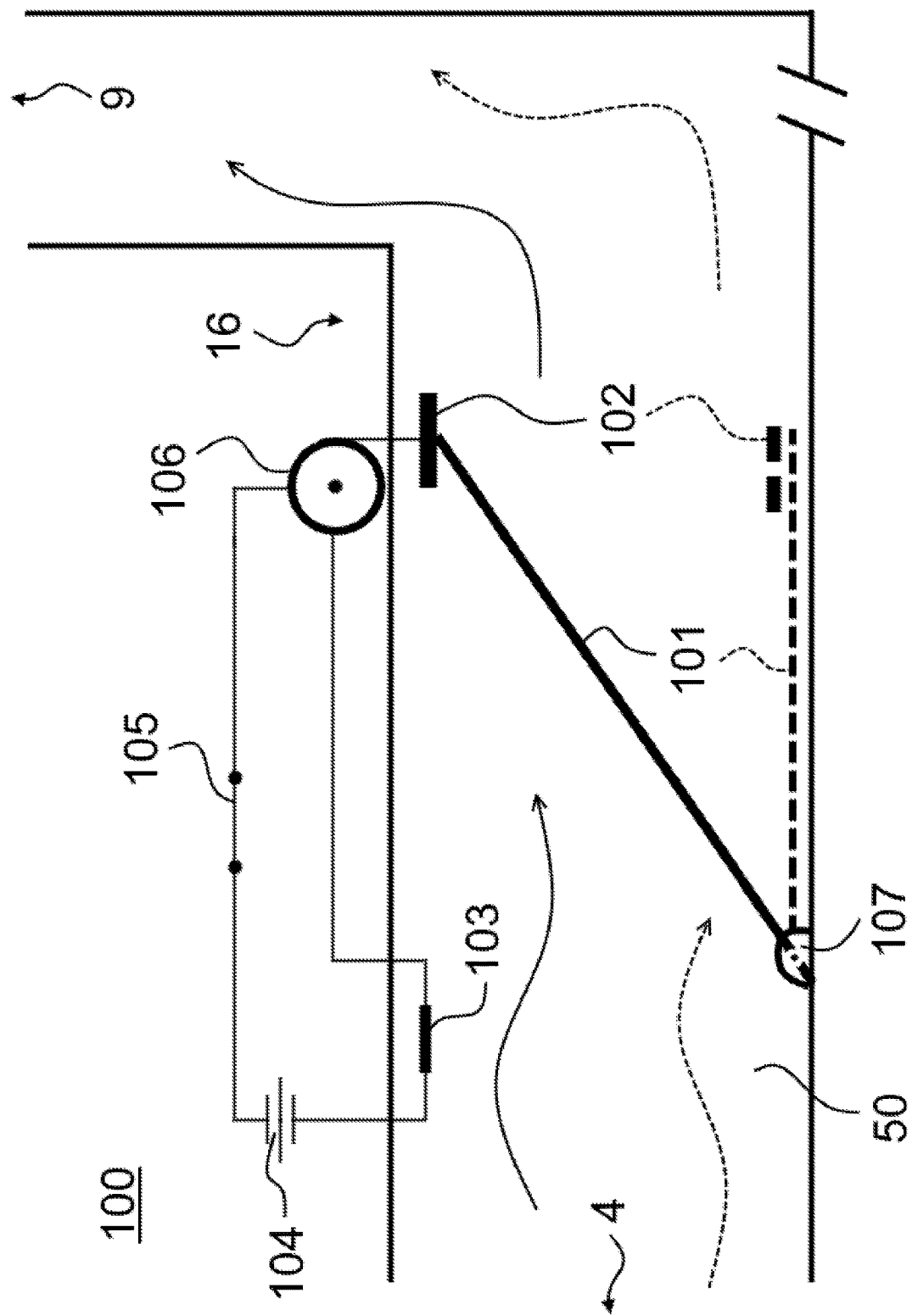
FIG. 3 is a schematic of an example embodiment coolant control system as installed in a flowpath.

FIG. 3 is a schematic illustration of an example embodiment coolant control system 100 useable in a nuclear reactor passive fluid heat exchanger flowpath 50, such as in RVACS of FIGS. 1 & 2. For example, system 100 may be installed in a horizontal piping connecting hot air riser 4 to exhaust 9 in an RVACS. Or, for example, system 100 may be installed in any other coolant fluid flowpath for flow control in the same. As shown in FIG. 3, example embodiment system 100 includes a moveable damper 101 that limits flow in fluid flowpath 50. Damper 101 is shown in solid line in a closed or partially-closed position, and in dashed line where moveable to an open position in FIG. 3. Damper 101 may be a plate, disc, or sheet of metal, plastic, or other fluid-blocking or limiting material that substantially seats to edges of flowpath 50, such as in a flow conduit in RVACS. Damper 101 may further be porous or include holes, cut-outs, and/or other flow passages that allow some reduced amount of flow through damper 101, potentially to prevent pressure building or stagnation of fluid.

Damper 101 is moveable between open and closed positions. For example, damper 101 may be substantially rigid and attached to a pivot 107 and attachment 102 to rotate between open and close positions, and increments thereof, in flowpath 50. As seen in FIG. 3, damper 101 may be in a first, closed position shown in solid line and released or moved to a second, open position shown in dotted line. When so moved, additional airflow through an RVACS, or other coolant fluid through flowpath 50, may be permitted, potentially up to full natural-circulation-induced RVACS flow for emergency cooling. When in a closed position, however, damper 101 may significantly limit flow through flowpath 50, so as to limit natural or forced circulation and in turn heat removal from a reactor by a fluid in flowpath 50. For example, if used in an RVACS system, closed damper 101 may prevent significant coolant flow from or in a hot air riser 4 to exhaust 9 (or into cold air downcomer 7 from air inlets 6) and thus prevent cooling and loss of heat from the reactor when closed. Such substantially reduced flows may still permit small amounts, such as 10% or less, of maximum coolant flow, to prevent stagnation and keep system 100 at a relatively same temperature as coolant throughout a system.

Damper 101 may be moved to several desired degrees of open and closed positions in several ways. For example, attachment 102 may release damper 101 to rotate about hinge 107 from the closed position shown in solid to the open position shown in dashed lines. Damper 101 may drop by a passive force, such as gravity, a spring, under force of fluid flow in flowpath 50, etc., to the open position when released from attachment 102. For example, attachment 102 may be or include an electromagnet that holds damper 101 in the closed position through a magnetic field interacting with magnetic material in damper 101. Attachment 102 may also be a mechanical fastener such as a hook and eyelet, chain interlink, screw and threaded hole, etc. or a direct connection. As power to an electromagnet in attachment 102 is cut off, or as attachment 102 is moved or rotated into a detaching configuration, damper 101 may detach from attachment 102 and move to the open position automatically through gravity or a spring in hinge 107, for example. Similarly, while not passive, a motor or other biasing drive may move damper 101 into the open position as desired.

Or, for example, damper 101 may be moved through movement of attachment 102. Attachment 102 may be connected to a winch 106 or actuating transducer or other moving structure, potentially outside flow conduit 50, that moves the same to desired positions in flowpath 50. Damper 101 may move with attachment 102 to achieve desired levels of closing flowpath 50. Similarly, attachment 102 may be repositioned to re-connect with damper 101 after a separation. For instance, following de-energizing of an electromagnet in attachment 102, damper 101 may assume its open position far from attachment 102; the electromagnet may be reenergized and positioned (shown in dash), such as via winch 106, sufficiently close to damper 101 to magnetically rejoin with attachment 102 and be repositioned into a closed position in flowpath 50.

As seen in FIG. 3, as damper 101 is held closed, flow through conduit 50 is restricted, and any cooling caused by such air is limited. If used in an RVACS, such as that of FIGS. 1 and 2, heat transfer from reactor 1 and containment 2 may be limited, reducing heat loss, temperature gradient, and flow-induced vibration, and improving thermodynamic efficiency. Damper 101 may still be opened through movement and/or release by attachment 102, preserving passive airflow through systems like RVACS.

As shown in FIG. 3, damper 101 may be moved passively and/or moved to a fail-safe open condition in example embodiment system 100. Power source 104 may provide electrical power to a circuit for such fail-safe opening. For example, power source 104 may be a DC generator, battery, power provided by plant grid, etc. that is always on when a nuclear reactor plant is in a steady-state operating condition. Power source 104 via the circuit may power winch 106 and/or attachment 102, such as by holding winch 106, attachment 102, and damper 101 in a most restricted position or powering an electromagnet in attachment 102. When power source 104 is deactivated or its circuit is opened, winch 106 and/or attachment 102 may lose power and allow damper 101 to return to an open position under the force of gravity, from a spring bias, under force of airflow, etc. Similarly, when power is regained, winch 106 may be extended for attachment 102 to rejoin to damper 101 and then retracted to move damper 101 into a closed position. In this way, damper 101 may always open in a loss of power scenario, maximizing flow, and potentially cooling, through flowpath 50.

One or more switches, such as temperature-dependent switch 103 and/or manual switch 105, may also be provided on the circuit to cut power to winch 106 and/or attachment 102 to open damper 101. For example, manual switch 105 may be an operator controlled switch from a control room or a local circuit breaker that the plant operator can activate to cause damper 101 to enter its maximum opening position when not powered by power source 104.

Similarly, temperature-dependent switch 103 may open upon ambient conditions reaching a threshold temperature, such as a temperature associated with abnormal operating conditions or an urgent need for cooling. For example, switch 103 may use a meltable conductor that opens the circuit at elevated temperatures. Depending on placement of switch 103 in proximity to a heat source, such as a reactor or hot exhaust, an amount and properly-alloyed material, such as Wood's metal, will melt and break/open the circuit at a specific temperature. Or, for example, a bimetallic spring or other temperature-dependent material may physically move out of contact with the circuit so as to break it at the threshold temperature. Because other aspects of example embodiment system 100 may be passive, an operator may not be required to take any action—temperature dependent switch 103 will cause damper 101 to move to a maximally-open position when a temperature associated with a transient or necessary cooling is reached. Although temperature-dependent switch 103 is shown in a same flowpath 50 as damper 101, it is understood that switch 103 may be remote and/or at a specific location that allows accurate temperature measurement and/or reflects cooling needs.

As seen above, several different structures are useable alone or in combination to passively open a damper in a coolant flowpath when such coolant is required. No external motor, battery, power source, human intervention, moving part, etc. is required to open damper 101 at a critical temperature or other transient condition. Structures are useable together to provide redundant fail-safes, such as temperature-dependent switch 103 that causes damper 101 to move to an open position at a reactor overheat temperature used in combination with a powered circuit that also causes damper 101 to move to the open position at loss of power 104 and/or human intervention via switch 105. Active systems, however, are useable in connection with example embodiment system 100, including fine movements of damper 101 with a winch 106 or other positioning device to achieve a desired incremental closure of flowpath 50, an active switch 105 that requires physical movement by an operator, etc.

Example embodiment system 100 may be fabricated of resilient materials that are compatible with a nuclear reactor environment without substantially changing in physical properties, such as becoming substantially radioactive, melting, embrittlement, and/or retaining/adsorbing radioactive particulates. For example, several known structural materials, including austenitic stainless steels 304 or 316, XM-19, zirconium alloys, nickel alloys, Alloy 600, etc. may be chosen for any element of components of example embodiment debris filters. Joining structures and directly-touching elements may be chosen of different and compatible materials to prevent fouling.

Example embodiment coolant control system 100 can be installed at plant fabrication or at any point at plant life. For example, system 100 may be installed in an existing RVACS or added to the same during plant construction by installing damper 101, temperature-dependent switch 103, and attachment 102 in flowpath 50, with associated power source 104 and winch 106 outside the same or elsewhere. This installation may even be performed while coolant is flowing through flowpath 50. Once installed, example embodiment system 100 may be held in a closed position with damper 101 reducing coolant flow with no further action required by an operator, or damper 101 may be actively moved to desired positions, such as by winch 106, under operator control. System 100 will nonetheless (re-)open flowpath 50 upon loss of power source 104 and/or reaching a transient temperature threshold that opens switch 103, without operator intervention.

Example embodiments and methods thus being described, it will be appreciated by one skilled in the art that example embodiments may be varied and substituted through routine experimentation while still falling within the scope of the following claims. For example, although a coolant flowpath in an RVACS is shown, other reactor coolant conduits can be used simply through proper shaping and sizing of example embodiments—and fall within the scope of the claims. Such variations are not to be regarded as departure from the scope of these claims.

What is claimed is:

1. A method of installing a passive safety system in a nuclear power plant, the method comprising:
    placing a moveable damper in a coolant flowpath about a nuclear power reactor, wherein the flowpath is configured to carry a coolant flow to remove heat from the reactor; and
    attaching the damper to an attachment configured to hold the moveable damper in a closed position when powered so as to restrict coolant flow in the flowpath, wherein the damper is configured to fall with gravity from the closed position restricting coolant flow through the flowpath to an open position permitting coolant flow through the flowpath, wherein the flowpath is a divided flow channel surrounding a perimeter of a containment structure surrounding a reactor vessel, wherein the divided flow channel includes a coolant downcomer opening at a coolant source inlet, and a coolant riser between the coolant downcomer and the containment structure, wherein the coolant downcomer and coolant riser are in fluid communication at a bottom of the divided flow channel.

2. The method of claim 1, further comprising:
    placing a temperature-dependent switch in the coolant flowpath; and
    connecting a power source to the temperature-dependent switch and the attachment such that the power source powers the attachment when the temperature-dependent switch is closed, wherein the temperature-dependent switch is configured to passively open at a threshold temperature associated with a transient in the reactor.

3. The method of claim 1, wherein the damper is a single continuous plate that alone entirely blocks the flowpath in the closed position.

4. The method of claim 1, wherein the reactor vessel includes a molten salt, wherein the coolant riser and the coolant downcomer are in fluid communication only at the bottom of the divided flow channel, and wherein air from the atmosphere is configured to flow through the divided flow channel to cool the containment structure and the reactor vessel when the damper is in the open position.

5. The method of claim 1, wherein the flowpath is horizontal where the damper is placed, and wherein the damper in the closed position extends at least partially vertically upward to substantially close the flowpath.

6. The method of claim 1, wherein the damper includes a hinge at a first end, and wherein the placing rotatably connects the damper to the flowpath via the hinge.

7. The method of claim 1, wherein the attachment includes an electromagnet, and wherein the damper includes a magnetic material such that the damper is securely joined to the attachment only when the electromagnet is powered.

8. The method of claim 7, wherein the attachment includes a meltable circuit that is configured to melt open and de-power the electromagnet at a threshold temperature associated with a transient in the reactor.

9. The method of claim 1, wherein the attachment is a winch, and wherein the attaching couples the damper to the winch.

10. The method of claim 9, further comprising:
    moving the damper via the winch in the flowpath.

11. The method of claim 1, wherein the flowpath is a conduit in a reactor vessel auxiliary cooling system (RVACS).

12. A method of operating the passive safety system installed in claim 1, the method comprising:
    powering the attachment to hold the moveable damper in the closed position.

13. The method of claim 12, further comprising:
    moving the attachment to the damper to the open position to connect the attachment to the damper;
    moving the attachment and the damper connected together to the closed position.

14. A method of passively cooling a nuclear power plant, the method comprising:
    placing a moveable damper in a coolant flowpath about a nuclear power reactor, wherein the flowpath is configured to carry a coolant flow to remove heat from the reactor;
    attaching the damper to an attachment configured to hold the moveable damper in a closed position when powered so as to restrict coolant flow in the flowpath and allow the moveable damper to move to an open position when unpowered so as to allow full coolant flow in the flowpath, wherein the flowpath is a divided flow channel surrounding a perimeter of a containment structure surrounding a reactor vessel, wherein the divided flow channel includes a coolant downcomer opening at a coolant source inlet, and a coolant riser between the coolant downcomer and the containment structure, wherein the coolant downcomer and coolant riser are in fluid communication at a bottom of the divided flow channel;

placing a temperature-dependent switch in the coolant flowpath; and connecting a power source to the temperature-dependent switch and the attachment such that the power source powers the attachment when the temperature-dependent switch is closed and the power source is unpowered when the temperature-dependent switch is opened.

15. The method of claim 14, wherein the temperature-dependent switch includes at least one of a meltable conductor and a bimetallic connection that are configured to open the switch at the threshold temperature.

16. The method of claim 14, wherein the flowpath is horizontal where the damper is placed, and wherein the damper in the closed position extends at least partially vertically upward to substantially close the flowpath.

17. The method of claim 14, wherein the attachment includes an electromagnet, and wherein the damper includes a magnetic material such that the damper is securely joined to the attachment only when the electromagnet is powered.

18. The method of claim 14, wherein the flowpath is a conduit in a reactor vessel auxiliary cooling system (RVACS).

19. The method of claim 14, wherein the damper is a single continuous plate that alone entirely blocks the flowpath in the closed position.

* * * * *